(12) United States Patent
Zhong et al.

(10) Patent No.: US 12,331,381 B1
(45) Date of Patent: Jun. 17, 2025

(54) METHOD OF USING A CHLORINATION METHOD TO RECYCLE METAL ELEMENTS IN LITHIUM BATTERIES

(71) Applicants: Shenzhen Huineng Energy Storage Materials Engineering Research Center Co., LTD, Shenzhen (CN); National Engineering Research Center of Advanced Energy Storage Materials (Shenzhen) Co., Ltd, Shenzhen (CN)

(72) Inventors: Faping Zhong, Shenzhen (CN); Chihuan He, Shenzhen (CN); Subin Jiang, Shenzhen (CN); Hongbing Liu, Shenzhen (CN); Jiqun Zhu, Shenzhen (CN); Shuifa Tan, Shenzhen (CN)

(73) Assignees: Shenzhen Huineng Energy Storage Materials Engineering Research Center Co., LTD, Shenzhen (CN); National Engineering Research Center of Advanced Energy Storage Materials (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 18/639,474

(22) Filed: Apr. 18, 2024

(30) Foreign Application Priority Data

Dec. 18, 2023 (CN) .......................... 202311736266.8

(51) Int. Cl.
*C22B 26/12* (2006.01)
*C22B 7/00* (2006.01)
(Continued)

(52) U.S. Cl.
CPC .......... *C22B 7/002* (2013.01); *C22B 21/0069* (2013.01); *C22B 26/12* (2013.01); *H01M 10/54* (2013.01)

(58) Field of Classification Search
CPC .. B09B 3/00; B09B 3/40; C22B 1/005; C22B 15/0056; C22B 23/04; C22B 7/004;
(Continued)

(56) References Cited

U.S. PATENT DOCUMENTS 6,468,483 B2 * 10/2002 Barnett .................. C01G 49/02
423/140

FOREIGN PATENT DOCUMENTS

CN          102757078 A  * 10/2012
CN          111495925 B  *  9/2021  ............... B09B 3/00

OTHER PUBLICATIONS

NPL: on-line translation of CN-111495925-B, Sep. 2021 (Year: 2021).*

(Continued)

*Primary Examiner* — Jie Yang
(74) *Attorney, Agent, or Firm* — Getech Law LLC; Jun Ye

(57) ABSTRACT

A method of using a chlorination method to recycle metal elements in lithium batteries includes, organic components in the lithium battery are removed, so as to obtain a mixture of powders containing the positive-electrode material; the powders are heated and chlorinated by chlorine, at a heating temperature of 500-1200° C.; gas products of the chlorination are output through a gas-solid filtration device, and then two stages of desublimation are used, wherein the temperature during the first-stage desublimation is set to be below 306° C. and above 178° C., so that $FeCl_3$ is desublimated into solid deposition, which is used for recycling Fe element; the temperature of the second-stage desublimation is set to (Continued)

be below 178° C., so that $AlCl_3$ is desublimated into solid deposition, which is used for recycling Al element; solid products of the chlorination are taken out for recycling the Li element.

9 Claims, 2 Drawing Sheets

(51) Int. Cl.
*C22B 21/00* (2006.01)
*H01M 10/54* (2006.01)

(58) Field of Classification Search
CPC ... H01M 10/0525; H01M 10/54; Y02E 60/10; Y02P 10/20; Y02W 30/20; Y02W 30/84
See application file for complete search history.

(56) References Cited

OTHER PUBLICATIONS

NPL: on-line translation of CN 102757078 A, Oct. 2012 (Year: 2012).*

* cited by examiner

METHOD OF USING A CHLORINATION METHOD TO RECYCLE METAL ELEMENTS IN LITHIUM BATTERIES

TECHNICAL FIELD

The present invention refers to a method of using a chlorination method to recycle metal elements in lithium batteries.

BACKGROUND

Discarded lithium batteries contain many environmentally harmful substances, such as heavy metals, electrolytes ($LiPF_6$), phenyl compounds, and ester compounds, which are difficult to degrade and are highly toxic.

Toxic substances in discarded lithium batteries cause damages to the environment. If untreated, heavy metals in cathode materials may contaminate soil and groundwater, graphite may generate dusts and thus cause air pollution. If improperly treated, electrolyte may cause fluorine pollution and organic pollution, the separator film is difficult to degrade and thus forms white pollution.

Besides, discarded lithium batteries contain many valuable metals (such as lithium, nickel, cobalt, manganese, copper, iron, aluminum, etc.). Therefore, it is of great value to efficiently recycle metals from lithium batteries.

However, the existing technologies of recycling lithium batteries have many shortcomings, such as complicated treatment processes, low recycling efficiency, high recycling costs, etc. Thus, we need to develop further improvement.

SUMMARY

The invention is set out in the appended set of claims.

A method of using a chlorination method to recycle metal elements in lithium batteries, including the following steps:

Step 1, organic components in the lithium battery are removed, so as to obtain a mixture of powders containing positive-electrode material;

Step 2, the powders are heated and chlorinated by chlorine, at a heating temperature of 500-1200° C.;

Step 3, gas products of the chlorination are output through a gas-solid filtration device, and then two stages of desublimation are used, wherein the temperature during the first-stage desublimation is set to be below 306° C. and above 178° C., so that $FeCl_3$ is desublimated into solid deposition, which is used for recycling Fe element; the temperature of the second-stage desublimation is set to be below 178° C., so that $AlCl_3$ is desublimated into solid deposition, which is used for recycling Al element;

Step 4, solid products of the chlorination are taken out for recycling the Li element.

Optionally, the Step 1 includes that the organic components and F in the lithium battery are removed.

Optionally, the organic components and F in the lithium battery are removed by pyrolysis.

Optionally, the Step 1 further includes physical sorting, by which metal sheets of current collectors are sorted out, and the left is the mixture of powders which contains positive-electrode material.

Optionally, the Step 1 does not separate positive electrode material from negative electrode material, so the mixture of powders obtained in Step 1 contains both the positive electrode material and carbon.

Optionally, the carbon content in the mixture of powders is 10 wt % or more, more preferably 20 wt % or more; if the carbon content in the mixture of powders is less than 10 wt %, additional carbon powders are added to achieve the carbon content of 10 wt % or above.

Optionally, in Step 2, the heating temperature for chlorination is below 800° C., and or even below 600° C.

Optionally, in Step 2, the chlorination lasts for 20 minutes or above, more preferably in a range from 20 minutes to 4 hours, and more preferably in a range from 30 minutes to 2 hours, for example 50 minutes.

Optionally, the gas-solid filtration device in the Step 3 uses a filter material which is resistant to chlorine corrosion, for example the filter material uses nickel, or a nickel alloy with a nickel content of 50% or above.

Optionally, the filter material is metal wire mesh, or sintered porous metal material, preferably a sintered porous metal on a porous substrate.

The present invention brings at least one of the following advantages.

1. The chlorination method provides a one-step conversion, wherein the one-step heating can convert various metal elements into metal salts, and the conversion rates thereof are high.
2. The conversion rate (recovery rate) of the metals are high. The conversion rates of Li/Mn/Ni/Co are all above 98%, even above 99.5%, or even above 99.8%.
3. Through two-stage/multi-stage desublimation, different kinds of metal chlorides can be easily separated.
4. An effective recycling of a mixture of different lithium batteries can be achieved, and it is not necessary to manually pre-separate ternary batteries from lithium iron phosphate batteries.
5. A high temperature of above 1000° C. can be avoided, and a condition of strong acid/strong alkali required for wet processing can be avoided.
6. The separation and removal of impurities are easy, and it can achieve low-pollution or even zero-pollution emissions.
7. The comprehensive cost of recycling is low.

DETAILED DESCRIPTION

Figure 1:
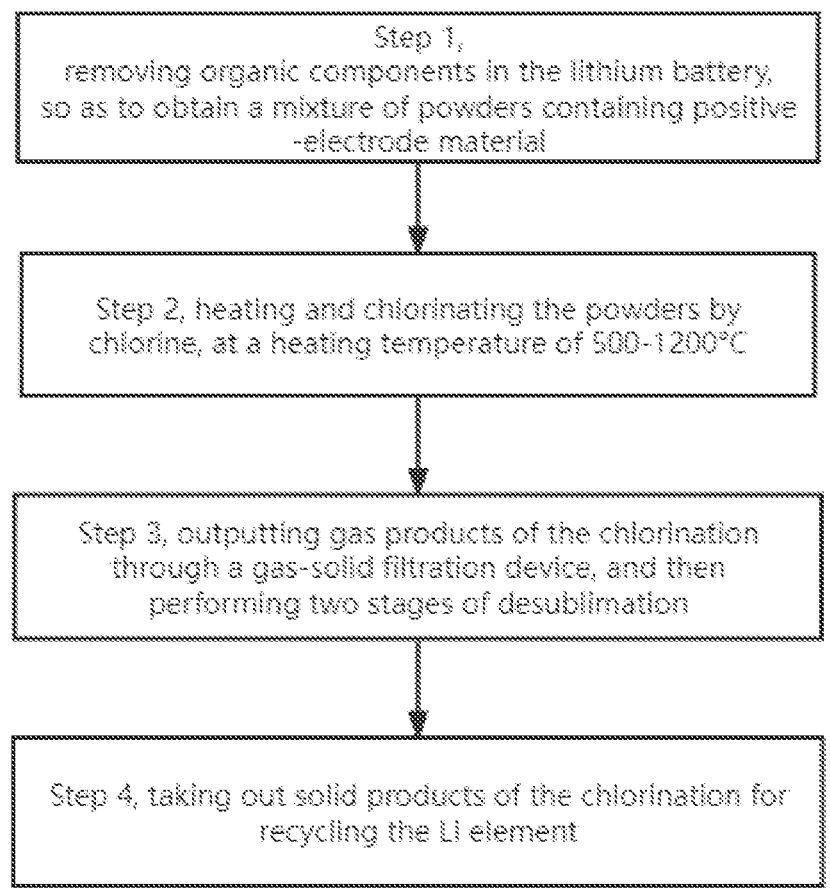
FIG. 1 shows the flow chart of the method of recycling metal elements in lithium batteries according to the present invention.
Figure 2:
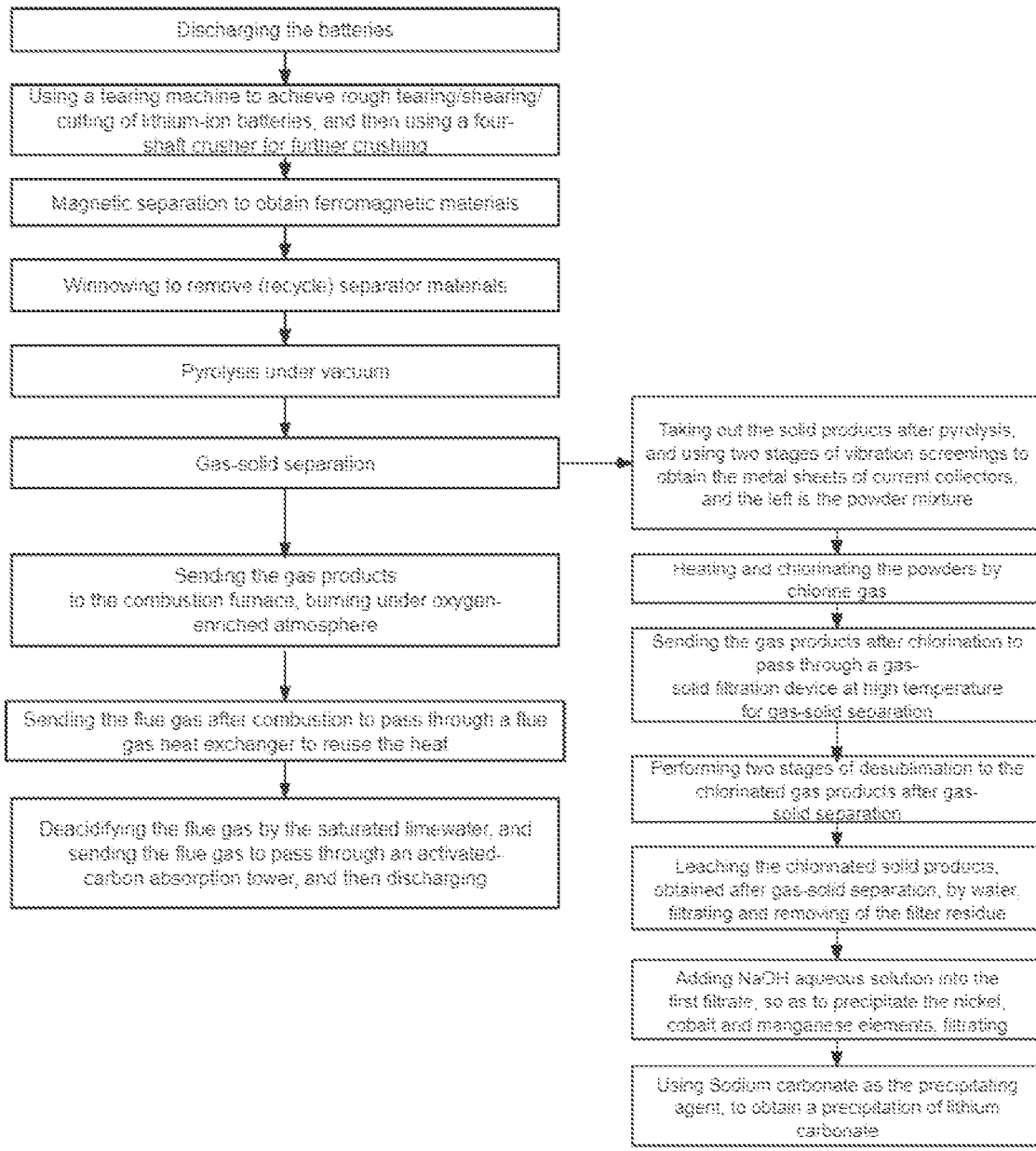
FIG. 2 shows the flow chart of the method according to the Example 1 of the present invention.

In the present invention, "lithium battery" is a synonym for "lithium-ion battery".

The present invention takes several lithium batteries on the market as examples. According to the materials of cathodes, lithium batteries on the market can be classified into ternary lithium batteries, lithium iron phosphate batteries, etc. According to the materials of battery casings, lithium batteries can be classified into soft-pack lithium batteries, aluminum-cased lithium batteries and steel-cased lithium batteries. For a soft-pack lithium battery, an aluminum-plastic film is usually used as a soft casing for packaging the battery cell. For an aluminum-cased lithium battery, aluminum or aluminum alloy is used as an aluminum hard casing for packaging the battery cell. For a steel-cased lithium battery, stainless steel is used as a hard casing for packaging the battery cell.

In an example, the to-be-recycled lithium battery mainly comprises the following components: positive current collector, negative current collector, binder, positive-electrode active material, negative-electrode active material, porous separator, electrolyte liquid, and casing.

For example, positive current collector may be aluminum foil, and negative current collector may be copper foil. The positive-electrode active material of ternary lithium battery may be NCM (three metal elements are nickel, cobalt and manganese) and NCA (three metal elements are nickel, cobalt and aluminum). Setting the three metal elements in different proportions can achieve different performances of battery. For example, in the embodiment of the present invention, $LiNi_xCo_yMn_zO_2$ and $LiCoO_2$ are used as positive-electrode active materials. The positive-electrode active material of lithium iron phosphate battery may be lithium iron phosphate ($LiFePO_4$).

Particles of the positive-electrode active material are mixed with the binder and then evenly coated on the positive current collector (aluminum foil), so as to form the positive electrode of the battery. Sometimes a conductive agent can be added, that is to say, the positive-electrode active material, the conductive agent and the binder are mixed, and then evenly coated on the positive current collector (aluminum foil).

The negative-electrode active material is normally graphite or graphene. For example, the negative-electrode active material is mixed with a binder (optionally, a conductive agent may be added), and then evenly coated on the negative current collector (copper foil), so as to form the negative electrode of the battery.

Normally, the binder may be polyvinylidene fluoride (PVDF), cellulose binder such as sodium carboxymethylcellulose (CMC), polyacrylic acid binder (PAA), styrene-butadiene rubber (SBR), or conductive binder, etc.

The conductive agent for lithium batteries may be traditional conductive agents (such as carbon black, conductive graphite, carbon fiber, etc.), or new-type conductive agents (such as carbon nanotubes, graphene, mixed conductive slurries, etc.). The commercial conductive agent on the market may be acetylene black (AB), Ketjen black (KB), vapor grown carbon fiber (VGCF), carbon nanotubes (CNT), etc.

The electrolyte contains lithium salt and organic solvent. The commonly-used lithium salt in lithium batteries is $LiPF_6$. The organic solvent is generally a carbonate organic compound, such as ethylene carbonate, propylene carbonate, diethyl carbonate, dimethyl carbonate, etc.

The porous separator is normally a polyolefin separator. For example, polyethylene (PE) or polypropylene (PP). The separator may have a structure of a single layer or a structure of three layers. For example, single-layer PE, single-layer PP, PP/PE/PP composite separator, etc.

The recycling of lithium batteries aims to use physical and/or chemical means to separate and/or convert the above components in the mixture. Firstly, some elements (especially some high-value metal elements) can be purified and reused; secondly, the discharged pollutants can be reduced.

The present invention provides a method of using a chlorination method to recycle metal elements in lithium batteries. The method includes the following steps:

Step 1, organic components in the lithium battery are removed, so as to obtain a mixture of powders containing the positive-electrode material;

Step 2, the powders are heated and chlorinated by chlorine, at a heating temperature of 500-1200° C.;

Step 3, gas products of the chlorination are output through a gas-solid filtration device, and then two stages of desublimation are used. The temperature during the first-stage desublimation is set to be below 306° C. and above 178° C., so that $FeCl_3$ is desublimated into solid deposition, which can be used for recycling Fe element; the temperature of the second-stage desublimation is set to be below 178° C., so that $AlCl_3$ is desublimated into solid deposition, which can be used for recycling Al element;

Step 4, solid products of the chlorination are taken out for recycling the Li element.

Step 2, a mixture after the pretreating includes: positive electrodes of batteries, negative electrodes of batteries, and electrolyte; the mixture is subjected to oxygen-free pyrolysis at a pyrolysis temperature of 400-600° C.;

Step 3, by using a gas-solid filtration device, gas products from the pyrolysis are separated and outputted, wherein anti-corrosion material(s) is (are) used to form filter element of the gas-solid filtration device;

Step 4, taking out solid products from the pyrolysis, so as to recycle metal elements; the metal elements include but are not limited to one or more selected from the following: lithium, aluminum, copper, iron, nickel, cobalt, manganese.

For example, step 1 may include battery discharging. Battery discharging is normally the first step in battery recycling. Completely discharging the battery pack can prevent the discarded batteries from concentrated heat release or short circuit during subsequent processing, and thus avoid fire and explosion incidents. For example, discharging can be conducted by chemical methods, that is, using the positive metal and negative metal of the battery as cathode and anode, and using an electrolysis process in a solution to consume the remaining power in the battery. For example, sodium chloride solution can be used as the electrolyte to discharge the lithium batteries.

For example, step 1 may also include disassembling. From a battery pack, a battery module or a battery system, single battery cells can be obtained by disassembling. In addition, through disassembling, single battery cells can be separated from structural parts, wires, and/or connectors (such as battery terminals).

For example, step 1 may also include crushing. Crushing is to fragment the battery through a crusher to obtain crushed products. Preferably, the size of the longest side of the crushed product is ≤6 cm, more preferably ≤4 cm. If it is a steel-cased lithium battery, a hammer crusher may be used for crushing. If it is a soft-packed lithium battery, a tearing machine can be firstly used to tear the casing, and then a crusher is used for crushing.

For example, for steel-cased lithium batteries, the step 1 may include a magnetic separation after crushing. Through magnetism, ferromagnetic substances such as stainless steel can be separated easily. This enables the separation and recycling of ferromagnetic materials such as stainless steel.

For example, step 1 may also include winnowing. For example, crushed products are thrown into an upward airflow. Under the action of an upward suction force generated by a ventilation fan, the lightest part of the products floating on the top is first sucked away through a side pipe. This enables the separation and recycling of (porous) separators. Besides, removing the separators can also reduce the waste gases generated by the pyrolysis of organic matter in subsequent pyrolysis process.

In Step 1 of the present invention, organic components are removed. For example, the binder is removed, so as to separate positive-electrode active materials from current collector. Preferably, pyrolysis (e.g. oxygen-free pyrolysis) is used to remove the binder, so as to separate positive-electrode active materials from current collector.

Preferably, the Step 1 of the present invention includes removing F and organic components in the lithium battery. For example, F and organic components in lithium batteries can be removed through oxygen-free pyrolysis.

In an embodiment, the present invention does not intentionally remove the electrolyte from the lithium batteries. Instead, the electrolyte is directly sent to the oxygen-free pyrolysis.

"oxygen-free" means to under the condition of vacuum or under the protection of protective gas (nitrogen or argon). Thereby the reactants will not have a chemical reaction with oxygen. Considering that the gas products after pyrolysis are preferred to be burned (combusted) in our invention, the pyrolysis is preferably performed under vacuum. It can avoid too many inert protective gases in the gas products which may reduce the efficiency of combustion. In an example, after feeding, the furnace is evacuated, until the vacuum degree in the furnace is less than 1000 Pa, more preferably less than 500 Pa, and then heating is started. In another example, replacement by nitrogen is combined with vacuuming, so as to eliminate oxygen from the furnace, until the vacuum degree in the furnace is less than 2000 Pa, more preferably less than 1000 Pa, and then heating is started.

The temperature of the oxygen-free pyrolysis in the present invention is 400-600° C., preferably 400-500° C., more preferably 430-480° C., such as 450° C. In this pyrolysis process, organic matter such as the binder is thermally decomposed, so that the positive/negative-electrode active materials can be easily separated from the positive/negative current collectors. Under this condition, lithium hexafluorophosphate in the electrolyte will also be fully pyrolyzed, and its pyrolysis products include phosphorus pentafluoride ($PF_5$) and hydrogen fluoride (HF).

Preferably, the reaction time of the oxygen-free pyrolysis lasts for no less than 30 minutes.

In the present invention, a gas-solid filtration device may be used to perform a gas-solid separation for the pyrolysis product. When lithium hexafluorophosphate is used in electrolyte in the present invention, phosphorus pentafluoride ($PF_5$) and hydrogen fluoride (HF) are generated after pyrolysis. Therein, hydrogen fluoride (HF) is highly corrosive, and phosphorus pentafluoride ($PF_5$) will enhance the corrosiveness of hydrogen fluoride (HF). Thus, the gas-solid filtration device of the present invention needs to use a filter material that are not easily corroded by HF and $PF_5$.

The filter material, which can be used in the present invention and is not easily corroded by HF and $PF_5$, is preferably a metal material that is resistant to corrosion by HF and $PF_5$.

The "metal" material mentioned in the present invention may be a pure metal or an alloy material.

Metal materials resistant to HF and $PF_5$ corrosion that can be used in the present invention may be nickel, nickel alloy, or molybdenum alloy. In addition, for chromium or titanium metal, hydrogen fluoride without water will form a passivation film on the surface of chromium or titanium. Thus, chromium, titanium, or alloys containing chromium/titanium are also applicable. In addition, some precious metals, like platinum, gold, or silver, will not be corroded by HF, and thus are also applicable, however they are too expensive and thus not preferred.

In the present invention, the preferred material is nickel, or a nickel alloy with a nickel content of 50% or above. The nickel alloy with a nickel content of 50% or above is for example Hastelloy alloy, Monel alloy, or NS3301 alloy.

Hastelloy is a nickel-based corrosion-resistant alloy, which is mainly divided into two categories: nickel-chromium alloy and nickel-chromium-molybdenum alloy. Hastelloy (Hastelloy alloy) is the general name of the commercial brands of nickel-based corrosion-resistant alloys produced by Hastelloy International Corporation in the United States. For example, Hastelloy C276 or Hastelloy B-2 has very good resistance to HF corrosion.

Monel alloy is an alloy wherein nickel is taken as a base, and copper, iron, and/or manganese are added, such as Monel 400 alloy (Ni68Cu28Fe).

NS3301 alloy is nickel-chromium-molybdenum alloy with a low molybdenum content. It can withstand high-temperature HF gas and is easy to be processed and shaped. The chemical composition of NS3301 alloy is the following: C≤0.03 wt %, Cr 14-17 wt %, Fe≤8.0 wt %, Mo 2-3 wt %, Ti 0.4-0.9 wt %, P≤0.03 wt %, S≤0.02 wt %, Si≤0.7 wt %, Mn≤1.0 wt %, the balance is Ni and inevitable impurities.

Among the above-mentioned three types of alloys, NS3301 alloy is the easiest to be drawn into wires, Monel alloy is followed, and Hastelloy is relatively difficult to be drawn into wires.

In an example, the filter material in the present invention is metal wire mesh. For example, the above-mentioned corrosion-resistant metal material is drawn into wires and then woven into a mesh. For example, pure nickel metal or NS3301 alloy or Monel alloy is drawn into wires, and then woven into a mesh. The diameter of the wire after drawing is preferably less than 0.5 mm, more preferably less than 0.3 mm, more preferably less than 0.2 mm; the size (the length of the longest side) of the mesh hole is preferably less than 0.5 mm, more preferably less than 0.3 mm. The metal wire mesh can be plain weave or be pressed into corrugations. Besides, the filtration effect can be increased by laminating multiple layers of metal meshes. When laminating multiple layers, multiple layers of wire mesh can be cross-overlapped at a certain angle, or the patterns of different layers can be staggered by a certain distance.

In another example, the filter material of the present invention is a sintered porous metal material. For example, porous metal material is obtained by sintering nickel powders or nickel alloy powders. As an example, nickel powders with an average particle size of no more than 100 microns are molded into a sheet, and then vacuum sintering is used, the vacuum degree is less than 1 Pa, the sintering temperature is 1000-1300° C. (such as 1200° C.), and the sintering time is more than 1 hour, thus the porous nickel material can be obtained. By using the powder sintering method, it can easily adjust the pore size of the porous metal material. For example, the average particle size of the powders, the size distribution of the powders, the particle shape of the powders, and the sintering temperature may affect the pore size of the sintered metal. Therefore, compared with the wire mesh, the method of sintering powders has the advantage that it is easier to prepare a filter material with smaller pore sizes (effective pore size).

In another example, the filter material of the present invention is a sintered porous metal on a porous substrate. The porous substrate may be metal foam or metal wire mesh. Metal foam/metal wire mesh has the advantages of good strength and is not easily broken. However, the pore size of metal foam/metal wire mesh is relatively large. By applying sintered porous metal material on it, the efficient pore size of the filter material can be reduced and the filtration effect can be improved. A metal foam used in the present invention may be for example nickel foam. A metal wire mesh used in the present invention may be for example drawing pure nickel or NS3301 alloy or Monel alloy into wires and then weaving into a mesh, but the present invention is not limited thereto. As an example, the metal wire mesh is a plain weave mesh obtained by drawing NS3301 alloy into wires. For example, the diameter of the wire after drawing is preferably less than 0.5 mm, and the size (the length of the longest side) of the mesh hole is preferably less than 0.5 mm. Then a slurry containing nickel powders is coated on the mesh, and then sintered. For example, nickel powders with a nearly spherical shape and with a particle size of less than 10 microns, ethanol as a dispersant, and polyvinyl butyral (PVB) as the binder are mixed into a slurry. For example, the mass ratio of nickel powders:ethanol:PVB is 50-85:100:2-5. For example, the sintering temperature is 1000-1200° C. (such as 1100° C.). The sintering time is no less than 1 h. Thereby, the sintered porous nickel material on the NS3301 alloy wire mesh is obtained. Since the slurry has a certain fluidity, it will move into the pores of the porous substrate, thereby forming an integrated filter material after sintering.

Preferably, in the present invention, the metal material that is not easily corroded by HF and $PF_5$, is also used for the inner wall of the pyrolysis furnace and the air channels connected thereof. For example, the above-mentioned nickel, chromium, titanium, or corresponding alloy. For example, the above-mentioned platinum, gold, or silver is expensive, but applicable. For example, the above-mentioned Hastelloy alloy, Monel alloy, or NS3301 alloy.

In the present invention, the gas products obtained after gas-solid separation may contain one or more components from the following: $H_2$, $CH_4$, CO, HF, $PF_5$, $CO_2$.

As mentioned above, when lithium hexafluorophosphate is used in electrolyte in the present invention, it generates phosphorus pentafluoride ($PF_5$) and hydrogen fluoride (HF) after pyrolysis.

During the pyrolysis process, the binder (such as polyvinylidene fluoride (PVDF)) pyrolyzes, so the positive/negative-electrode active material peels off from the current collector. The pyrolysis products of PVDF mainly include fluorides, such as hydrofluoric acid, fluorocarbons, etc., and also include a small amount of alkanes and hydrocarbons.

During the pyrolysis process, the organic solvent (such as ethylene carbonate, propylene carbonate, diethyl carbonate) in the electrolyte volatilizes in the form of steam, or decomposes into carbon monoxide, carbon dioxide, etc.

In addition, the mixture entering the pyrolysis may contain residual separators (polyethylene (PE) or polypropylene (PP)). After pyrolysis, the carbon chains are broken into hydrogen, methane, hydrocarbons, aldehydes, carbon monoxide, etc.

In the present invention, the gas products obtained after gas-solid separation may be sent to a combustion furnace.

In the present invention, it is preferred that the high-temperature pyrolyzed gas is directly sent to the combustion furnace after the gas-solid separation, without an additional cooling step.

That is to say, the high-temperature gas passes through the gas-solid filtration device in a high temperature of above 200° C., preferably above 300° C., and is then sent to the combustion furnace in a high temperature of above 200° C., preferably above 300° C. This can make full use of the heat of the flue gas to promote combustion and thus can save energy.

Preferably, oxygen-enriched combustion technology is used. Preferably, oxygen-enriched air with an oxygen content of 25% or above, or even 35% or above, or pure oxygen is used as a combustion-supporting gas. The excess oxygen coefficient is 100% or above, or even 120% or above. In an example of the present invention, the high-temperature gas products with a temperature of above 200° C. are injected into the combustion furnace in batches, which will spontaneously combust under the oxygen-enriched condition.

In a preferred embodiment, a flue gas heat exchanger is used to reuse the heat from the flue gas after combustion.

In the present invention, the combustion products of the gas components are acidic substances (carbonic acid, phosphoric acid, hydrofluoric acid, etc.), therefore, the acid radicals therein can be absorbed by an alkaline solution (such as limewater). The produced salts, such as calcium salts, can be used in industry. For example, the produced salts may be calcium fluoride, calcium phosphate, etc.

In an example, the flue gas after combustion in the present invention can be deacidified by alkaline solution. For example, a flue gas purification device may be used. For example, an injecting device is used to inject alkaline solution into the flue gas in a purification furnace, so as to perform a deacidification reaction. The alkaline solution may be limewater, such as a saturated aqueous solution of calcium hydroxide. Thereby, phosphorus-containing acidic gas in flue gas may be converted into calcium phosphate, fluorine-containing acidic gas in flue gas may be converted into calcium fluoride, etc.

In an example of the present invention, the gas after deacidification by the alkaline solution can be further treated by a simple post-processing (such as using a dust collector to remove dust or using activated carbon to absorb pollutants), and then meet the emission standards, and then can be directly discharged. For example, by using various dust collectors in the existing technology, dust particles in the flue gas can be separated and removed, so as to meet the emission standards required by environmental protection. For example, an activated-carbon adsorption tower may be used to purify the exhaust gas and to remove particulate pollutants from flue gas, so as to meet the emission standards required by environmental protection.

In another example, a dust removal device, such as a cyclone dust removal tower and/or a bag dust removal tower, may be provided before the deacidification by alkaline solution, so as to pre-remove some dust particles.

In another alternative example, the gas products, obtained after pyrolysis and gas-solid separation, first pass through the alkaline solution (to remove HF, $PF_5$), and then are sent to the combustion furnace for combustion (to remove $H_2$, $CH_4$, and CO). Thus, the main products after combustion are water and carbon dioxide. Therefore, if the dust particles after combustion meet the standards, the exhaust gas can be discharged directly; if there are too many dust particles after combustion, dust removal can be performed until the standards are met, then the exhaust gas can be discharged.

After pyrolysis and gas-solid separation, solid products are taken out from the pyrolysis furnace, so as to recycle metal elements; the metal elements include but are not limited to one or more selected from the following: lithium, aluminum, copper, iron, nickel, cobalt, manganese.

In the present invention, the solid products after the pyrolysis mainly include current collectors (such as aluminum foil, copper foil), carbon (from negative-electrode active materials, and from the pyrolysis of some organic matter), positive-electrode materials (such as lithium iron phosphate or ternary materials).

Preferably, the step 1 of the present invention further includes physical sorting. By physical sorting, metal sheets of current collectors can be sorted out, and then a mixture of powders is left. By physical screening, such as vibrating screening, metal sheets can be separated from powders.

Preferably, two or more stages of vibrating screenings may be used. In the first screening, the large particles (large metal sheets) are screened out, then in the second screening, the medium particles (medium metal sheets) are screened out, and finally the powders (powder mixture) are left. In an example, a screen having a mesh size of 10-40 mesh is used for the first screening, and a screen having a mesh size of 100-200 mesh is used for the second screening.

The metal sheets obtained after physical screening are normally copper foil and/or aluminum foil. Since the aluminum foil is lighter and the copper foil is heavier, the copper foil and aluminum foil can be further separated by a shaker.

In the present invention, the powder mixture obtained after physical screening contains the positive-electrode material(s), as well as carbon from the negative-electrode active material(s).

The present invention recycles metal elements from the powders (powder mixture), by a chlorination method.

The present invention provides a method of using a chlorination method to recycle metal elements in lithium batteries, including the following steps:

Step 2, powders are heated and chlorinated by chlorine, at a heating temperature of 500-1200° C.;

Step 3, gas products of the chlorination are output through a gas-solid filtration device, and then two stages of desublimation are used. The temperature during the first-stage desublimation is set to be below 306° C. and above 178° C., so that $FeCl_3$ is desublimated into solid deposition, which can be used for recycling Fe element; the temperature of the second-stage desublimation is set to be below 178° C., so that $AlCl_3$ is desublimated into solid deposition, which can be used for recycling Al element;

Step 4, solid products of the chlorination are taken out for recycling the Li element.

As mentioned above, the powders (powder mixture) of the present invention contain carbon, which is derived from the negative-electrode active material (graphite). This kind of carbon will not leave during oxygen-free pyrolysis, and thus can be used as carbon sources to assist the chlorination. Carbon can promote the reaction that metal oxides are chlorinated into chlorine salts. For the chlorination process with the help of carbon, it may undergo a one-step reaction, or a two-step reaction, that is, the metal oxide is first reduced by carbon into metal, and then chlorinated by chlorine into chloride salt. The chlorination reaction can be schematically represented as follows.

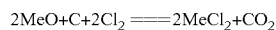

$$2MeO + C + 2Cl_2 === 2MeCl_2 + CO_2$$

$$MeO + C + Cl_2 === MeCl_2 + CO_2$$

Therefore, in the present invention, the carbon content in the powder mixture is preferably 10 wt % or more (in view of the total powder mixture), more preferably 20 wt % or more. If the carbon content in the powder mixture is less than 10 wt %, additional carbon powders may be added to achieve a carbon content of 10 wt % or above, and then the chlorination step is performed.

Preferably, the Step 1 does not separate positive electrode material from negative electrode material, so the mixture of powders obtained in Step 1 contains both the positive electrode active material and carbon.

In practice, we notice that discarded lithium batteries usually contain more than 20 wt % carbon. The carbon content therein is definitely more than needed, thus the addition of carbon source is not required.

The temperature for chlorination can be 500 to 1200° C. However, the higher the temperature, the greater the energy consumption and the higher the safety requirements for the equipment. The present invention found that even at a lower temperature, such as below 800° C., or even below 600° C., a sufficiently good effect of chlorination can be achieved.

To convert the metals in the powders into chloride salts, the amount of feeding material can be determined by experiences or by measuring the total metal concentration through sampling. It is preferred that the powders and chlorine gas are so fed that the excess of chlorine gas is at least 10%.

The chlorination reaction of the present invention lasts for preferably 20 minutes or more, more preferably in a range from 20 minutes to 4 hours, and more preferably in a range from 30 minutes to 2 hours, for example 50 minutes. In the present invention, the chlorination furnace does not require a high-pressure environment, and the initial gas pressure before heating may be approximately 1 atm or be slightly greater than 1 atm, such as 110 kPa to 130 kPa.

The gas products after chlorination pass through a gas-solid filtration device at high temperature (320° C. or above) for gas-solid separation.

Here, the gas-solid filtration device after chlorination needs to use a filter material that is not easily corroded by high-temperature chlorine, and preferably a metal material that is resistant to chlorine corrosion.

The "metal" material mentioned in the present invention may be a pure metal or an alloy material.

Metal materials resistant to chlorine corrosion that can be used in the present invention may be nickel, nickel alloy, or molybdenum alloy. Titanium/chromium/platinum/gold/silver is more likely to react with chlorine, and thus is not preferred.

In the present invention, the preferred material is nickel, or a nickel alloy with a nickel content of 50% or above. The nickel alloy with a nickel content of 50% or above is for example Hastelloy alloy (e.g. Hastelloy C-276), or NS3301 alloy.

Besides, in the present invention, it is preferred to perform the gas-solid separation after chlorination at a temperature of below 500° C., or even below 400° C. For example, the chlorinated products undergo a certain cooling (or heat exchange or heat recovery) and then pass through a gas-solid filtration device. Such a lower temperature can significantly reduce the chlorine corrosion on the metal filter.

In an example, the filter material in the present invention is metal wire mesh. For example, the above-mentioned corrosion-resistant metal material is drawn into wires and then woven into a mesh. For example, pure nickel metal or NS3301 alloy or Hastelloy C-276 alloy is drawn into wires, and then woven into a mesh. The diameter of the wire after drawing is preferably less than 0.5 mm, more preferably less than 0.3 mm, more preferably less than 0.2 mm; the size (the length of the longest side) of the mesh hole is preferably less than 0.5 mm, more preferably less than 0.3 mm. The metal wire mesh can be plain weave or be pressed into corrugations. Besides, the filtration effect can be increased by laminating multiple layers of metal meshes. When laminating multiple layers, multiple layers of wire mesh can be cross-overlapped at a certain angle, or the patterns of different layers can be staggered by a certain distance.

In another example, the filter material of the present invention is a sintered porous metal material. For example, porous metal material is obtained by sintering nickel powders or nickel alloy powders. As an example, nickel powders with an average particle size of no more than 100 microns are molded into a sheet, and then vacuum sintering is used, the vacuum degree is less than 1 Pa, the sintering temperature is 1000-1300° C. (such as 1200° C.), and the sintering time is more than 1 hour, thus the porous nickel material can be obtained. By using the powder sintering method, it can easily adjust the pore size of the porous metal material. For example, the average particle size of the powders, the size distribution of the powders, the particle shape of the powders, and the sintering temperature may affect the pore size of the sintered metal. Therefore, compared with the wire mesh, the method of sintering powders has the advantage that it is easier to prepare a filter material with smaller pore sizes (effective pore size).

In another example, the filter material of the present invention is a sintered porous metal on a porous substrate. The porous substrate may be metal foam or metal wire mesh. Metal foam/metal wire mesh has the advantages of good strength and is not easily broken. However, the pore size of metal foam/metal wire mesh is relatively large. By applying sintered porous metal material on it, the efficient pore size of the filter material can be reduced and the filtration effect can be improved. A metal foam used in the present invention may be for example nickel foam. A metal wire mesh used in the present invention may be for example drawing pure nickel or NS3301 alloy or Hastelloy C-276 alloy into wires and then weaving into a mesh, but the present invention is not limited thereto. As an example, the metal wire mesh is a plain weave mesh obtained by drawing NS3301 alloy into wires. For example, the diameter of the wire after drawing is preferably less than 0.5 mm, and the size (the length of the longest side) of the mesh hole is preferably less than 0.5 mm. Then a slurry containing nickel powders is coated on the mesh, and then sintered. For example, nickel powders with a nearly spherical shape and with a particle size of less than 10 microns, ethanol as a dispersant, and polyvinyl butyral (PVB) as the binder are mixed into a slurry. For example, the mass ratio of nickel powders:ethanol:PVB is 50-85:100:2-5. For example, the sintering temperature is 1000-1200° C. (such as 1100° C.). The sintering time is no less than 1 h. Thereby, the sintered porous nickel material on the NS3301 alloy wire mesh is obtained. Since the slurry has a certain fluidity, it will move into the pores of the porous substrate, thereby forming an integrated filter material after sintering.

Preferably, in the present invention, the metal material that is not easily corroded by chlorine, is also used for the inner wall of the chlorination furnace and the air channels connected thereof. For example, the above-mentioned nickel, or nickel alloy, or molybdenum alloy. The preferred material is nickel, or a nickel alloy with a nickel content of 50% or above. For example, Hastelloy alloy (e.g. Hastelloy C-276) or NS3301 alloy.

The gas products after chlorination pass through a gas-solid filtration device at high temperature (320° C. or above) for gas-solid separation. At this time, the gases passing through the gas-solid filtration device include $FeCl_3$ (melting point 306° C., boiling point 316° C.) and/or $AlCl_3$ (melting point 194° C., boiling point 180° C.).

The Fe element may come from the positive-electrode active material of the lithium iron phosphate battery or may come from the remnants of the steel casings. The Al element may come from the casings (such as aluminum casing or aluminum-plastic casing). Aluminum is relatively easy to be broken, if there are many small aluminum powders after crushing, the aluminum content in the powder mixture entering chlorination may be relatively high, often reaching 4 wt % or more.

For the chlorinated gas products after gas-solid separation, two stages of desublimation are used. The temperature during the first-stage desublimation is set to be below 306° C. and above 178° C., so that $FeCl_3$ is desublimated into solid deposition, which can be used for recycling Fe element; the temperature of the second-stage desublimation is set to be below 178° C., so that $AlCl_3$ is desublimated into solid deposition, which can be used for recycling Al element.

For example, silicon tetrachloride gas at 220-240° C. may be used as the cooling agent to perform the first-stage desublimation. For example, silicon tetrachloride gas at 100-120° C. may be used as the cooling agent to perform the second-stage desublimation.

The exhaust gas is further treated and can be discharged if meeting the standards. For example, the exhaust gas may contain excess chlorine, which can be absorbed by alkaline solution. For example, the chlorination reaction in the presence of carbon will produce carbon dioxide, which is neither toxic nor harmful, and thus can be directly discharged after the removal of chlorine.

The chlorinated solid products, obtained after gas-solid separation, normally contains lithium chloride, nickel chloride, cobalt chloride, and/or manganese chloride. These chloride salts are soluble in water and therefore can be leached by water. By filtrating and removal of the filter residue, the first filtrate is obtained.

In an example, by adding an alkaline solution that can provide OH (such as NaOH aqueous solution, such as 5-30 wt % NaOH aqueous solution, for example 10 wt %), nickel, cobalt and manganese elements can be precipitated. After filtration, the second filtrate is obtained. The second filtrate contains lithium chloride, which can be used to recycle lithium element.

Regarding recycling lithium element, by adding a precipitating agent, precipitation of lithium salt can be obtained. For example, if sodium carbonate is used as the precipitating agent, a precipitation of lithium carbonate can be obtained. For example, a 200-500 g/L (such as 300 g/L) sodium carbonate aqueous solution is heated to above 90° C. (such as 95° C.), and then lithium solution is added. Holding the temperature for more than 30 minutes. In an example, the lithium concentration in the lithium solution is first measured, and then the amount of excess sodium carbonate is adjusted to be 10% or more. In another example, after precipitating at a constant temperature of above 90° C. for a while, a sample is taken out to analyze the carbonate concentration in the mother solution, and the carbonate concentration is controlled to be 13-18 g/L. If the carbonate concentration is too high, adding lithium solution; and if it is too low, adding sodium carbonate aqueous solution.

In order to better understand the present invention, the following detailed examples are provided. These embodiments are only used to illustrate the present invention and should not be construed as limitations of the present invention.

Example 1

Using pyrolysis+chlorination method to recycle mixed lithium batteries.

The mixed lithium batteries are formed by several types of lithium batteries. They include both steel-cased lithium battery and soft-packed (aluminum-plastic film) lithium battery and include both ternary lithium battery (LiNi$_x$Co$_y$Mn$_z$O$_2$ and LiCoO$_2$) and lithium iron phosphate battery.

In this example, the ternary lithium battery mainly comprises the following: the positive-electrode active material (LiNi$_x$Co$_y$Mn$_z$O$_2$ and LiCoO$_2$), conductive agent (acetylene black) and binder (polyvinylidene fluoride (PVDF)) are mixed, and then coated on the current collector Al foil, so as to form the positive electrode; the negative-electrode active material (graphite), conductive agent (acetylene black) and binder (styrene-butadiene rubber (SBR)) are mixed, and then coated on the Cu foil, so as to form the negative electrode; the electrolyte comprises lithium salt (LiPF$_6$) and organic solvent (dimethyl carbonate). The porous separator is a polyethylene (PE) separator.

In this example, the lithium iron phosphate battery uses lithium iron phosphate as the positive-electrode active material, and the others are similar to the ternary lithium battery.

In this example, the recycling method includes the following steps.

1. Discharging the batteries.
2. A tearing machine is used to achieve rough tearing/shearing/cutting of lithium-ion batteries, and then a four-shaft crusher is used for further crushing. After crushing, the size of the longest side of a crushed product is ≤4 cm.
3. Magnetic separation to obtain ferromagnetic materials (stainless steel casings).
4. Winnowing to remove (recycle) separator materials.
5. Pyrolysis under vacuum, wherein before heating the vacuum degree in the furnace is less than 500 Pa, during pyrolysis the temperature in the pyrolysis furnace is controlled at 450±20° C., and the pyrolysis time is 1 hour.
6. Opening the valve of the gas outlet of the pyrolysis furnace and pumping the gas products of pyrolysis into the gas outlet. The gas products pass through the gas-solid filtration device, and then are sent to the combustion furnace, burning under oxygen-enriched atmosphere (the combustion-supporting gas has an oxygen content of 25% or above), the excess oxygen coefficient is 100%.
7. Sending the flue gas after combustion to pass through a flue gas heat exchanger to reuse the heat.
8. Deacidifying the flue gas by the saturated limewater and sending the flue gas to pass through an activated-carbon absorption tower, and then discharging if meeting the standards.
9. Taking out the solid products after pyrolysis and using two stages of vibration screenings to obtain the metal sheets of current collectors (copper foil and/or aluminum foil), and the left is the powder mixture (powders).
10. Heating and chlorinating the powders by chlorine gas. No additional carbon source is added. Vacuuming and then feeding chlorine until the chlorine gas pressure in the furnace is 110 kPa (and the excess of chlorine gas is adjusted to be at least 10%), and then heating to a chlorination temperature of 550±10° C., holding the temperature for 50 minutes.
11. Sending the gas products after chlorination to pass through a gas-solid filtration device at high temperature (320° C. or above) for gas-solid separation.
12. Performing two stages of desublimation to the chlorinated gas products after gas-solid separation. For the first-stage desublimation, silicon tetrachloride gas at 220-240° C. is used as the cooling agent, so that FeCl$_3$ is desublimated into solid deposition. For the second-stage desublimation, silicon tetrachloride gas at 100-120° C. is used as the cooling agent, so that AlCl$_3$ is desublimated into solid deposition. For the exhaust gas, alkaline solution is used to absorb the excess chlorine. After treatment, the exhaust gas can be discharged if meeting the standards.
13. Leaching the chlorinated solid products, obtained after gas-solid separation, by water. By filtrating and removal of the filter residue, the first filtrate is obtained.
14. Adding 10 wt % NaOH aqueous solution into the first filtrate, so as to precipitate the nickel, cobalt and manganese elements. After filtration, the second filtrate is obtained. The second filtrate contains lithium chloride.
15. Using Sodium carbonate as the precipitating agent, to obtain a precipitation of lithium carbonate, wherein 300 g/L sodium carbonate aqueous solution (the excess of sodium carbonate is in amount of 10%) is heated to 95° C., and then lithium solution (the second filtrate) is added, and then it is held at the temperature for more than 30 minutes.

What is claimed is:

1. A method of using a chlorination method to recycle metal elements in lithium batteries, including the following steps:

Step 1, removing organic components in the lithium battery through oxygen-free pyrolysis at a temperature of 400-600° C. for one hour, so as to obtain a mixture of powders containing positive-electrode material and carbon, wherein removing organic components in the lithium battery further comprises pumping gas products of the oxygen-free pyrolysis into a gas outlet, passing the gas products through a gas-solid filtration device to a combustion furnace, burning under oxygen-enriched atmosphere, where the excess oxygen coefficient is 100%, sending the flue gas after combustion to pass through a flue gas heat exchanger, deacidfying the flue gas by saturated limewater, sending the flue gas to pass through an activated-carbon absorption tower, taking out the solid products after pyrolysis, using two stages of vibration screenings to obtain the metal sheets of current collectors, and adding carbon powders to the mixture of powders to achieve a carbon content of 10 wt % in the mixture of powders, wherein removing organic components further comprises discharging the lithium battery, dissembling the lithium battery, crushing the lithium battery so a longest side of the crushed lithium battery is ≤4 cm, performing magnetic separation, and winnowing, Step 2, heating and chlorinating the powders by chlorine at a heating temperature of 500-1200° C., wherein the initial gas pressure before heating is 1 atm, wherein heating and chlorinating the powders by chlorine further comprises vacuuming and heating chlorine until the chlorine gas pressure in the furnace is 110 kPa and the excess of chlorine gas is adjusted to be at least 10%, Step 3, outputting gas products of the chlorination through a gas-solid filtration device at a high temperature of 320° C. or above, and then performing two stages of desublimation, wherein the temperature during the first-stage desublimation is set to be below 306° C. and above 178° C., so that FeCl$_3$ is desublimated into solid deposition, which is used for recycling Fe element; the temperature of the second-stage desublimation is set to be below 178° C., so that AlCl$_3$ is desublimated into solid deposition, which is used for recycling Al element;

Step 4, taking out solid products of the chlorination for recycling the Li element,
   wherein taking out solid products of the chlorination for recycling the Li element further comprises leaching the solid products by water, obtaining a first filtrate by filtering and removing the filter residue, adding 10 wt % NaOH aqueous solution into the first filtrate to precipitate nickel, cobalt, and manganese elements, filtering to obtain a second filtrate, and obtaining a precipitation of lithium carbonate by using sodium carbonate as the precipitating agent, wherein the sodium carbonate is heated to 95° C. and the second filtrate is added and held for more than 30 minutes.

2. The method of claim 1, wherein the Step 1 includes removing the organic components and fluorine in the lithium battery.

3. The method of claim 2, wherein the Step 1 includes pyrolysis so as to remove the organic components and fluorine.

4. The method of claim 1, wherein the Step 1 further includes physical sorting, by which metal sheets of current collectors are sorted out, and the left is the mixture of powders which contains positive-electrode material.

5. The method of claim 1, wherein the Step 1 does not include a step of separating positive electrode material from negative electrode material, so the mixture of powders obtained in Step 1 contains both the positive electrode material and carbon.

6. The method of claim 5, wherein the carbon content in the mixture of powders is 10 wt % or more, more preferably 20 wt % or more; if the carbon content in the mixture of powders is less than 10 wt %, additional carbon powders are added to achieve the carbon content of 10 wt % or above.

7. The method of claim 1, wherein in Step 2, the chlorination lasts for 20 minutes or above.

8. The method of claim 1, wherein the gas-solid filtration device in the Step 3 uses a filter material which is resistant to chlorine corrosion.

9. The method of claim 8, wherein the filter material is metal wire mesh, sintered porous metal material, or a sintered porous metal on a porous substrate.

* * * * *